(12) United States Patent    (10) Patent No.: US 8,679,385 B2
Chou    (45) Date of Patent: Mar. 25, 2014

(54) METHOD OF FORMING POROUS CERAMIC ARTICLES USING INERT GAS

(75) Inventor: Kevin Ying Chou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 336 days.

(21) Appl. No.: 12/955,312

(22) Filed: Nov. 29, 2010

(65) Prior Publication Data

US 2012/0135854 A1    May 31, 2012

(51) Int. Cl.
 B29C 44/34 (2006.01)
 B29C 44/46 (2006.01)
 C04B 38/00 (2006.01)
 C04B 38/02 (2006.01)
 C04B 38/10 (2006.01)

(52) U.S. Cl.
 USPC .............. 264/50; 264/51; 501/80; 501/84

(58) Field of Classification Search
 USPC ............... 501/80, 84; 264/41, 50, 51
 See application file for complete search history.

(56) References Cited

U.S. PATENT DOCUMENTS

| 4,659,546 A * | 4/1987 | Kearns ..................... 419/2 |
| 2008/0004171 A1* | 1/2008 | Melscoet-Chauvel et al. ............... 501/119 |
| 2010/0056355 A1* | 3/2010 | Brundage et al. .......... 501/85 |

FOREIGN PATENT DOCUMENTS

| JP | 2003/213304 | 7/2003 | ........... B22F 3/02 |
| WO | 02/47893 | 6/2002 | ........... B29C 67/00 |
| WO | 2006/130759 | 12/2006 | .......... C04B 35/478 |
| WO | 2009/027837 | 3/2009 | .......... C04B 35/185 |
| WO | 2010/024913 | 3/2010 | .......... C04B 38/00 |

OTHER PUBLICATIONS

Wang et al. Fabrication of cellular and microcellular ceramics with controllable open-cell content from polysiloxane-LDPE blends: I. Compounding and Foaming. J Mater Sci (2007) 42:2854-2861.*

* cited by examiner

Primary Examiner — Kaj K Olsen
Assistant Examiner — Noah Wiese
(74) Attorney, Agent, or Firm — Charles A. Greene; Matthew J. Mason

(57) ABSTRACT

A method of manufacturing a porous ceramic article is provided that includes injecting a gas into a precursor batch material. The gas is pressurized to a positive gauge pressure. Exemplary gasses that can be injected into the precursor batch material include at least one of nitrogen, helium, neon, argon, krypton, and xenon. Air can also be injected into the precursor batch material, including air in which at least a portion of $CO_2$ and/or $O_2$ naturally occurring in air has been removed.

20 Claims, 7 Drawing Sheets

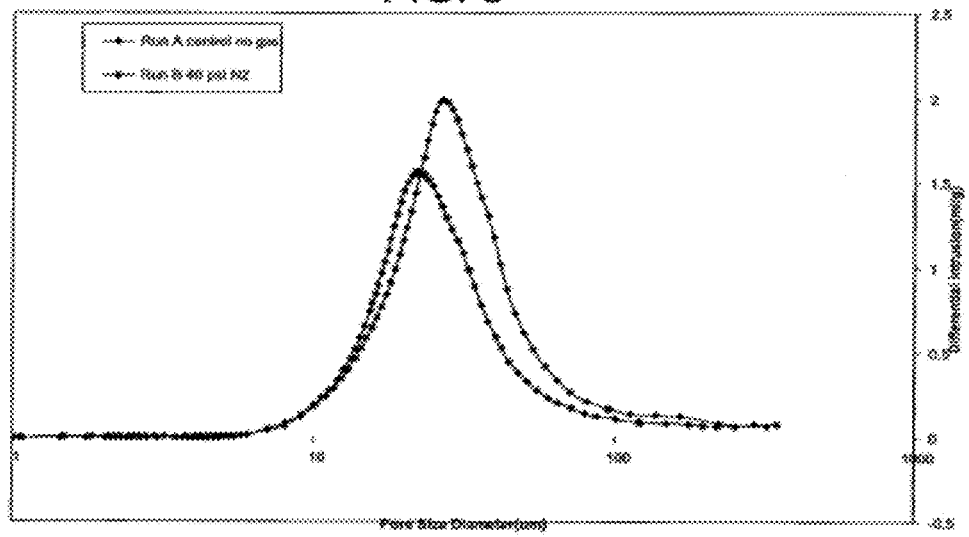

METHOD OF FORMING POROUS CERAMIC ARTICLES USING INERT GAS

BACKGROUND

The disclosure relates generally to porous ceramic articles and more particularly to methods of forming porous ceramic articles using inert gas.

In the manufacture of porous ceramic articles, porosity and pore size distribution are generally achieved through the use of pore former ingredients, including organic materials, such as starches, and inorganic materials, such as graphite. These pore forming agents are burned off during firing to create voids or pores. However, the use of starches, graphite or a mixture of both can create severe complexities during both the drying and firing of ceramic bodies, especially relating to crack generation. For example, the depth of penetration of microwaves during drying of green bodies can be limited due to the presence of pore formers, such as graphite, or strong temperature gradients can occur in the green bodies during drying or firing. In addition, firing cycles may need to be tailored or lengthened to burn off pore formers, which can lead to higher costs, more complexity, and/or reduced production rates, particularly in the case of particulate filters where high porosity is required and, consequently, high levels of such pore formers are introduced. Exemplary particulate filters may be used for diesel engines (referred to as DPFs (diesel particulate filters)) and for gasoline engines (referred to as GPFs (gasoline particulate filters)).

Attempts to create high levels of porosity without use of excess amounts of starch or graphite pore formers have focused on, for example, the use of volatile hydrocarbons capable at volatilizing at a temperature below 200° C. or the use of carbon dioxide in a liquid state under very high pressure (e.g., at least 1650 psi). However, these approaches can have various drawbacks, including cost, environmental impact, extrusion stability issues, and non-uniform porosity.

SUMMARY

One embodiment of the disclosure relates to a method of manufacturing a porous ceramic article. The method includes providing a precursor batch for forming a porous ceramic article. The method also includes injecting a gas into the precursor batch, wherein the gas is pressurized to a positive gauge pressure. In addition, the method includes forming the precursor batch into a green body while maintaining the pressure. The method further includes removing the pressure from the green body. Additionally, the method includes firing the green body to produce a porous ceramic article.

The embodiment described above includes those in which the positive gauge pressure is from about 10 psig to about 1000 psig.

The embodiment described above also includes those in which the $CO_2$ content of the gas is less than about 250 ppm.

Another embodiment of the disclosure relates to a porous ceramic article made by the method described above.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 plots pore size distribution for two exemplary extrusions of cordierite, comparing nitrogen injection and no gas injection.

DETAILED DESCRIPTION

Figure 1:
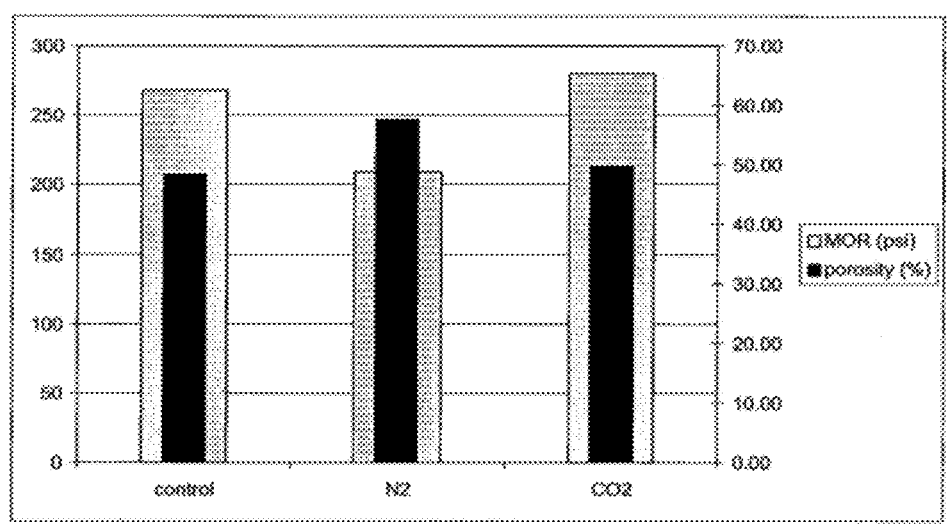
FIG. 1 plots MOR versus porosity for fired honeycomb bodies formed from aluminum titanate (AT), comparing exemplary runs with nitrogen injection, carbon dioxide injection, and no gas injection.

Disclosed herein is a novel process for manufacturing porous ceramic articles using inert gas. The use of the inert gas enables the porosity of the ceramic articles, such as ceramic articles having a honeycomb structure, to be increased.

The values $D_{10}$ and $D_{50}$ are defined as the pore diameters at 10% and 50% of the cumulative pore size distribution based upon volume, as measured by mercury porosimetry, with $D_{10} < D_{50}$. Thus, $D_{50}$ is the median pore diameter, and $D_{10}$ is the pore diameter at which 10% of the pores are finer, based upon volume.

The term "d-factor" ($D_f$) characterizes the narrowness of the smaller pore size portion of the pore size distribution and is given by the following equation: $D_f = (D_{50} - D_{10})/D_{50}$.

The inert gas can be introduced into a ceramic batch during extrusion in, for example, the mixing/shearing zone of an extruder and/or in the conveying zone of an extruder. Back pressure in the extruder can allow for the compression of the inert gas. After formation of a green body, the pressure can be removed, allowing at least some of the inert gas to escape and also allowing for the creation of pores in the green body. It is believed that such pore creation allows for increased porosity in the ultimate fired ceramic article without necessitating an increased thermal load during firing (e.g., in the firing kiln).

The types of porous ceramic articles that can be manufactured using methods disclosed herein are not limited to any particular materials or ingredient components. In exemplary embodiments, the porous ceramic article comprises at least one material selected from the group consisting of aluminum titanate (AT), alumina ($Al_2O_3$), cordierite, mullite, silicon carbide (SiC), silicon aluminum oxynitride (SiAlON), and zeolites.

In one set of exemplary embodiments, the porous ceramic article comprises aluminum titanate (AT).

In one set of exemplary embodiments, the porous ceramic article comprises cordierite.

In exemplary embodiments, the inert gas comprises at least one component selected from the group consisting of nitrogen, helium, neon, argon, krypton, or xenon.

In one set of exemplary embodiments, the inert gas comprises nitrogen, such as at least 90% nitrogen by volume, and further such as at least 95% nitrogen by volume, and even further such as at least 99% nitrogen by volume. The inert gas can also comprise essentially pure nitrogen.

In one set of exemplary embodiments, the inert gas comprises helium, such as at least 90% helium by volume, and further such as at least 95% helium by volume, and even further such as at least 99% helium by volume. The inert gas can also comprise essentially pure helium.

In one set of exemplary embodiments, the inert gas comprises argon, such as at least 90% argon by volume, and further such as at least 95% argon by volume, and even further such as at least 99% argon by volume. The inert gas can also comprise essentially pure argon.

In one set of exemplary embodiments, the inert gas comprises mixtures of at least two of nitrogen, helium, and argon. For example, the inert gas can comprise mixtures of at least two of nitrogen, helium, and argon wherein each component in the mixture comprises at least 10% by volume of the mixture. For example, the inert gas can comprise a mixture comprising nitrogen and helium comprising at least 10% nitrogen by volume and at least 10% helium by volume, a mixture comprising nitrogen and argon comprising at least 10% nitrogen by volume and at least 10% argon by volume, a mixture comprising helium and argon comprising at least 10% helium by volume and at least 10% argon by volume, and a mixture comprising nitrogen, helium, and argon, comprising at least 10% nitrogen by volume, at least 10% helium by volume, and at least 10% argon by volume.

In one set of exemplary embodiments, the gas introduced into the ceramic batch comprises a mixture of nitrogen and air. Air can be understood as a mixture of gasses including, in addition to water vapor, nitrogen, oxygen, argon, carbon dioxide, neon, and helium, present in ratios as occurring naturally in the Earth's atmosphere.

For example, the gas can comprise at least 25% air by volume and at least 25% nitrogen by volume, including from about a 25:75 volume ratio of air to nitrogen to about a 75:25 volume ratio of air to nitrogen, including from about a 40:60 volume ratio of air to nitrogen to about a 60:40 volume ratio of air to nitrogen, including about a 50:50 ratio of air to nitrogen.

In one set of exemplary embodiments, the gas introduced into the ceramic batch comprises a mixture of helium and air. For example, the gas can comprise at least 25% air by volume and at least 25% helium by volume, including from about a 25:75 volume ratio of air to helium to about a 75:25 volume ratio of air to helium, including from about a 40:60 volume ratio of air to helium to about a 60:40 volume ratio of air to helium, including about a 50:50 ratio of air to helium.

In one set of exemplary embodiments, the gas introduced into the ceramic batch comprises a mixture of argon and air. For example, the gas can comprise at least 25% air by volume and at least 25% argon by volume, including from about a 25:75 volume ratio of air to argon to about a 75:25 volume ratio of air to argon, including from about a 40:60 volume ratio of air to argon to about a 60:40 volume ratio of air to argon, including about a 50:50 ratio of air to argon.

In one set of exemplary embodiments, the gas introduced into the ceramic batch comprises air. The air may or may not be mixed with substantial amounts of other gases. In some exemplary embodiments, the air has reduced $CO_2$ levels as compared to $CO_2$ naturally occurring in air. The reduction in $CO_2$ levels can be accomplished, for example, via scrubbing, using standard known methods for $CO_2$ scrubbing. Exemplary embodiments include those in which at least 50% of $CO_2$ naturally occurring in air has been removed, such as those in which at least 75% of $CO_2$ naturally occurring in air has been removed, and further such as those in which at least 90% of $CO_2$ naturally occurring in air has been removed, and yet further such as those in which at least 95% of $CO_2$ naturally occurring in air has been removed, and still yet further such as those in which at least 99% of $CO_2$ naturally occurring in air has been removed.

In some exemplary embodiments, the air has reduced $O_2$ levels as compared to $O_2$ naturally occurring in air. The reduction in $O_2$ levels can be accomplished, for example, via scrubbing, using standard known methods for $O_2$ scrubbing. Exemplary embodiments include those in which at least 50% of $O_2$ naturally occurring in air has been removed, such as those in which at least 75% of $O_2$ naturally occurring in air has been removed, and further such as those in which at least 90% of $O_2$ naturally occurring in air has been removed, and yet further such as those in which at least 95% of $O_2$ naturally occurring in air has been removed, and still yet further such as those in which at least 99% of $O_2$ naturally occurring in air has been removed.

In some exemplary embodiments, the gas introduced into the ceramic batch has a $CO_2$ content of less than about 250 ppm, such as less than about 150 ppm, further such as less than about 100 ppm, and yet further such as less than about 50 ppm, and still yet further such as less than about 25 ppm, including from about 1 to about 200 ppm, about 1 to about 100 ppm, about 1 to about 50 ppm, and about 1 to about 25 ppm. The gas introduced into the ceramic batch may also be essentially free of $CO_2$.

In some exemplary embodiments, the gas introduced into the ceramic batch has an $O_2$ content of less than about 10% by volume, such as less than about 5% by volume, further such as less than about 2% by volume, and yet further such as less than about 1% by volume, including from about 0.1 to about 10% by volume, about 0.1 to about 5% by volume, about 0.1 to about 2% by volume, about 0.1 to about 1% by volume. The gas introduced into the ceramic batch may also be essentially free of $O_2$.

In embodiments disclosed herein, the gas introduced into the ceramic batch is introduced at a positive gauge pressure. In some exemplary embodiments, the gauge pressure is at least about 10 psig, such as from about 10 psig to about 1000 psig, including from about 10 psig to about 500 psig, further including from about 10 psig to about 250 psig, still further including from about 10 psig to about 100 psig, still yet further including from about 10 psig to about 50 psig, including about 30 psig.

In one set of exemplary embodiments, methods disclosed herein further comprise the step of depressurizing an environment containing the precursor batch prior to injecting the gas into the precursor batch. The depressurizing step can be accomplished, for example, through use of a vacuum pump. For example, the step of depressurizing can comprise reducing the pressure by at least 90%, such as at least 95%, and further such as at least 99%.

EXAMPLES

The disclosure and scope of the appended claims will be further clarified by the following examples.

Example 1

Aluminum titanate (AT) composition with nitrogen injection as compared to AT composition with carbon dioxide injection and AT composition with no gas injection An aluminum titanate (AT) ceramic batch composition was prepared having the raw material ingredients present within the amounts or ranges set forth in Table 1.

TABLE 1

|  | Weight percent |
|---|---|
| Inorganic base component | |
| Silica | 8-12 |
| Strontium carbonate | 5-10 |
| Calcium carbonate | 1-2 |
| Alumina | 45-50 |
| Titanium dioxide | 25-30 |
| Hydrated alumina | 2-5 |
| Lanthanum oxide | 0-1 |
| Superadded component | |
| Graphite | 10 |
| Potato starch | 8 |
| Methylcellulose | 4.5 |
| Water | 15 |
| Tall oil | 1 |

Six experimental runs were conducted using the ceramic batch composition set forth in Table 1. In each of these experimental runs, a 32 mm twin screw machine (TSM) was used to plasticize the ceramic batch to form a plastic batch, which was then extruded into a 2" honeycomb using an extrusion die. The extruder was configured to allow the air to be evacuated by a vacuum pump prior to gas injection, and a seal was provided between the vacuum pump and the $N_2$ or $CO_2$ injection zone. The purpose of the seal was to prevent the injected gas (e.g., $N_2$ or $CO_2$) gas from traveling backward through the extruder and being evacuated with the air. This gas injection point was down stream of the seal and well before the exit of the extruder. The pressure of gas ($N_2$ or $CO_2$) injection was regulated to be about 30 psi.

The six experimental runs were as follows: (1) Run 1-control: No gas was injected into the extruder, the ceramic batch was plasticized under vacuum, and an extruded honeycomb was produced that contained no injected gas; (2) Run 2-$N_2$: $N_2$ was injected into the extruder at 30 psi, the ceramic batch was plasticized upstream from the injection point under vacuum, and an extruded honeycomb was produced that contained pressurized $N_2$; (3) Run 3-$CO_2$: $CO_2$ was injected into the extruder at 30 psi, the ceramic batch was plasticized upstream from the injection point under vacuum, and an extruded honeycomb was produced that contained pressurized $CO_2$; (4) Run 4-control; repeat of Run 1; (5) Run 5-$N_2$; repeat of Run 2; and (6) Run 6-$CO_2$; repeat of Run 3.

All the extruded honeycombs were dried in a microwave oven and fired in a kiln using a standard AT cycle. The porosity results of the fired AT honeycombs are shown in Table 2.

TABLE 2

| Experimental Run | Porosity % | $D_{50}(\mu m)$ | $(D_{50}-D_{10})/D_{50}$ |
|---|---|---|---|
| 1 (control) | 48.54 | 15.07 | 0.420 |
| 2 ($N_2$) | 56.11 | 17.01 | 0.396 |
| 3 ($CO_2$) | 47.62 | 14.98 | 0.404 |
| 4 (control) | 48.00 | 15.89 | 0.369 |
| 5 ($N_2$) | 59.02 | 17.98 | 0.408 |
| 6 ($CO_2$) | 51.71 | 16.22 | 0.433 |

As can be seen, Run 2 and Run 5 with $N_2$ injection showed significantly higher porosity than those of the control conditions (Run 1 and Run 4) and $CO_2$ conditions (Run 3 and Run 6). $N_2$ conditions (Run 2 and Run 5) also showed higher average pore diameter ($D_{50}$), while the D factor ($D_{50}-D_{10}/D_{50}$) was relatively similar for all conditions.

In order to determine whether the higher porosity of the $N_2$ runs originated in the green state (prior to firing) or in the firing state, microwave dried honeycombs of Runs 1-3 were tested for green porosity. Table 3 shows the results of the green porosity for Runs 1-3.

TABLE 3

| Experimental Run | Porosity % | $D_{50}(\mu m)$ |
|---|---|---|
| 1 (control) | 26.5 | 0.055 |
| 2 ($N_2$) | 36.5 | 0.143 |
| 3 ($CO_2$) | 26.1 | 0.061 |

As can be seen, Run 2 with $N_2$ injection showed significantly higher porosity than that of Runs 1 & 3. This result suggested that the higher porosity of $N_2$ conditions (Run 2 and Run 5) in Table 2 may be a result of increased porosity in the green state due to $N_2$ gas.

Modulus of Rupture (MOR) of the fired AT honeycombs from the six experimental runs was measured by the four-point flexural method on an axial specimen and is shown in Table 4.

TABLE 4

| Experimental Run | MOR average (PSI) | Standard deviation (PSI) |
|---|---|---|
| 1 (control) | 262.3 | 21.3 |
| 2 ($N_2$) | 208.1 | 8.0 |
| 3 ($CO_2$) | 275.4 | 12.7 |
| 4 (control) | 273.4 | 23.2 |
| 5 ($N_2$) | 210.2 | 3.2 |
| 6 ($CO_2$) | 285.3 | 8.3 |

As one would expect, the $N_2$ conditions (Run 2 and Run 5) showed notably lower MOR strength due to their higher porosity.

FIG. 1 plots MOR versus porosity for fired AT honeycombs, where an average of two runs for each condition was compared (average control=average of Runs 1 & 4; average $N_2$=average of Runs 2 & 5; average $CO_2$=average of Runs 3 & 6). As can be seen in FIG. 1, $N_2$ injection increased the porosity while lowering the MOR. However, $CO_2$ injection had no significant impact on either porosity or MOR.

Figure 2:
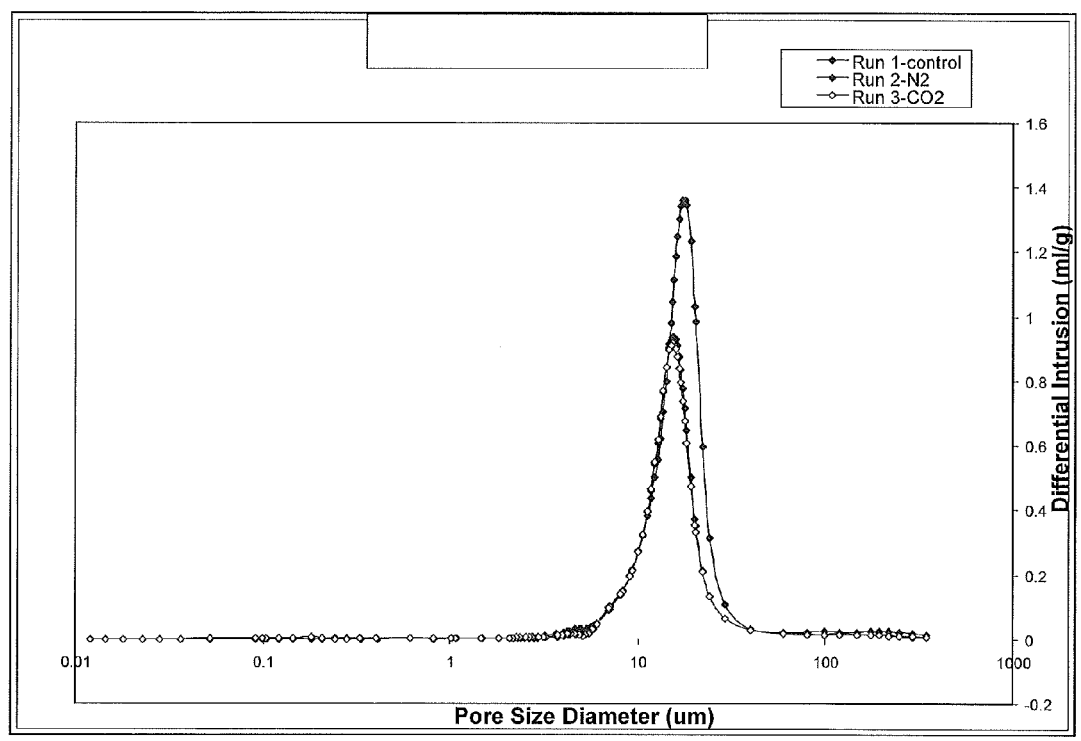
FIG. 2 plots pore size distribution for three exemplary extrusions of AT honeycomb bodies.

FIG. 2 plots pore size distribution of Runs 1-3. As can be seen, Run 2 with $N_2$ showed significant higher porosity while maintaining a narrow distribution similar to the control condition (Run 1). Run 3 with $CO_2$ showed no significant impact on either porosity or distribution as compared to the control condition (Run 1).

Figure 3:
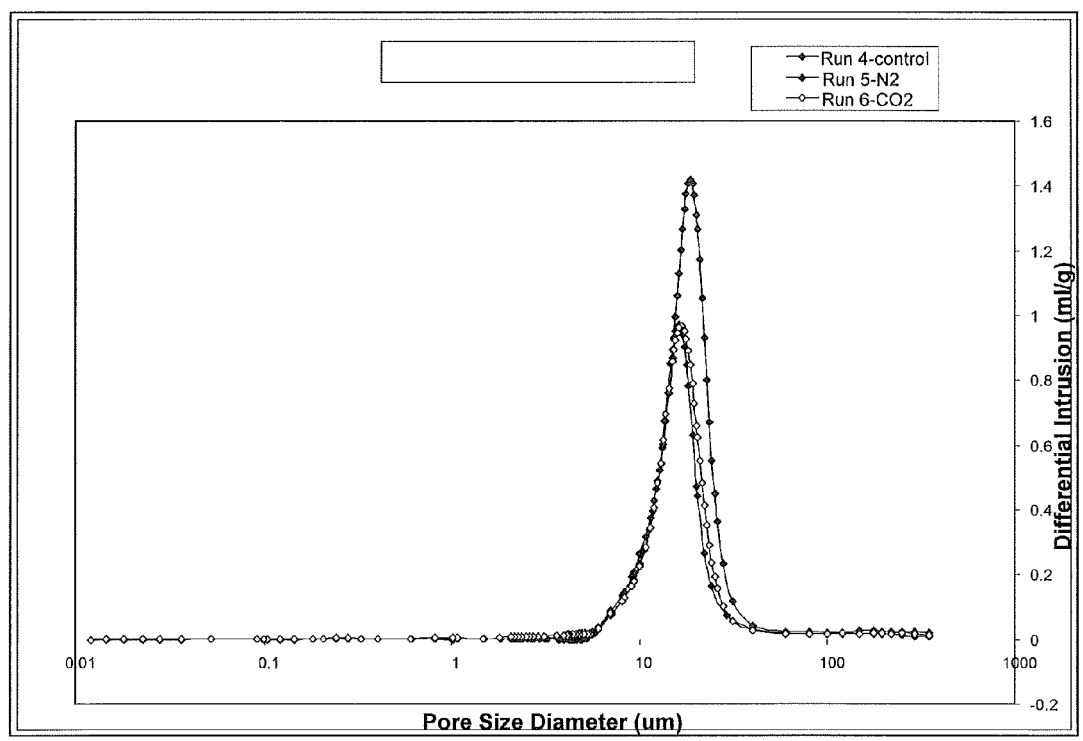
FIG. 3 plots pore size distribution for three additional exemplary extrusions of AT honeycomb bodies.

FIG. 3 plots the pore size distribution of Runs 4-6. Clearly, the trend for Runs 4-6 was the same as Runs 1-3 shown in FIG. 2.

Figure 4A:
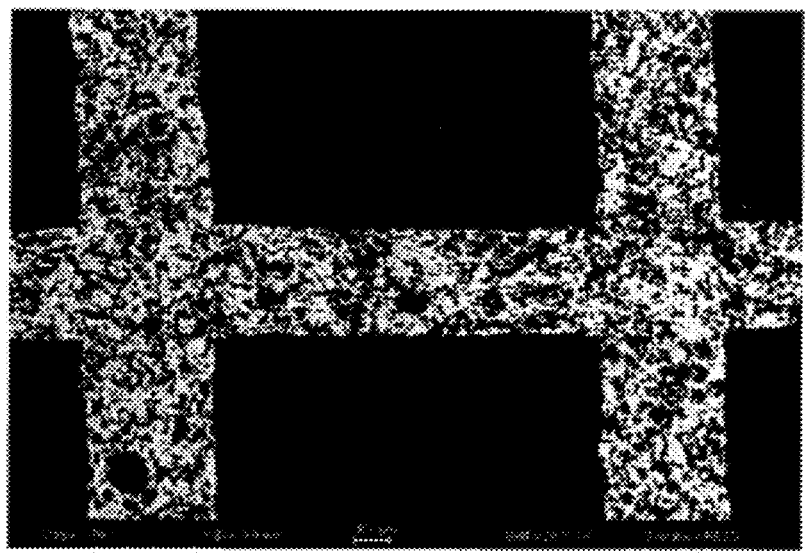
FIGS. 4A-4C show SEM micrographs of the polished cross-sectional surfaces for fired AT honeycomb bodies.
Figure 4B:
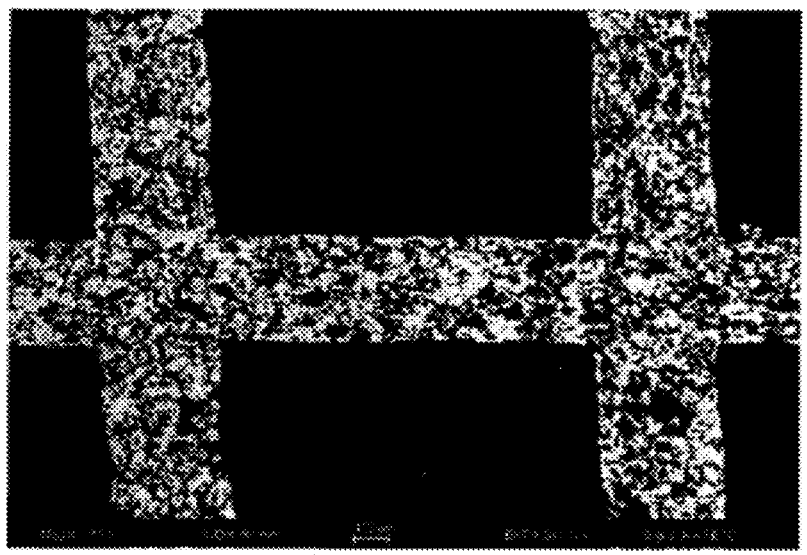
Figure 4C:
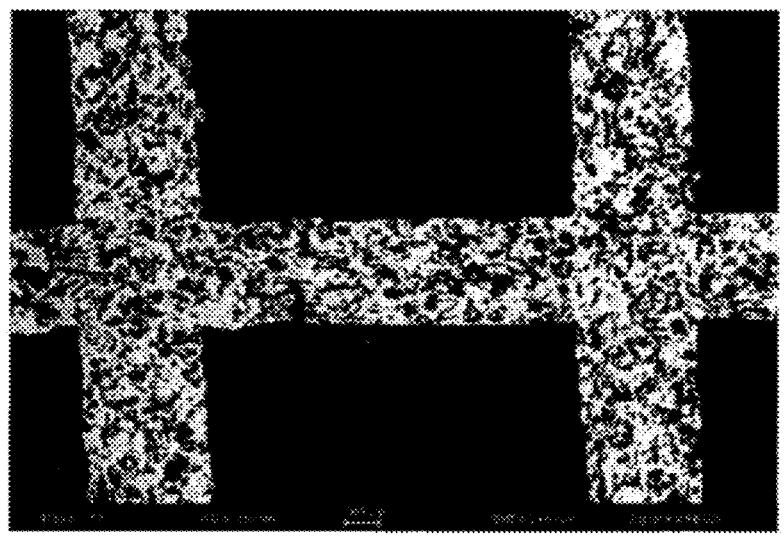

FIGS. 4A-4C show SEM micrographs of the polished surfaces for fired AT honeycombs. The $N_2$ condition (Run 2) showed uniform pore distribution similar to both the control condition (Run 1) and the $CO_2$ condition (Run 3) but with higher porosity.

Table 5 shows the coefficient of thermal expansion (CTE) between 25° C. and 800° C. for fired AT honeycombs for both heating and cooling cycles. It appeared that $N_2$ conditions (Run 2 and Run 5) showed slightly higher CTE than those of control conditions (Run 1 and Run 4) and $CO_2$ conditions (Run 3 and Run 6).

TABLE 5

| Experimental Run | CTE (heating 25-800° C.) $1 \times 10-7/°$ C. | CTE (cooling 25-800° C.) $1 \times 10-7/°$ C. |
|---|---|---|
| 1 (control) | 3.7 | −1.8 |
| 2 ($N_2$) | 4.5 | −0.9 |
| 3 ($CO_2$) | 3.2 | −1.4 |
| 4 (control) | 1.5 | −4.1 |
| 5 ($N_2$) | 4.1 | −2.3 |
| 6 ($CO_2$) | 1.2 | −3.9 |

Example 2

Cordierite composition with nitrogen injection as compared to cordierite composition with no gas injection A cordierite ceramic batch composition was prepared having the raw material ingredients present within the ranges set forth in Table 6.

TABLE 6

| | Weight percent |
|---|---|
| Inorganic base component | |
| Silica | 15-20 |
| Alumina | 25-30 |
| Hydrous clay | 10-15 |
| Talc | 40-45 |
| Superadded component | |
| Graphite | 15-20 |
| Potato starch | 25-30 |
| Lanthanum oxide | 0-1 |
| Methylcellulose | 5-10 |
| Deionized water | 25-30 |
| Tall oil | 0-1 |

Two experimental runs, Run A and Run B, were conducted in the same manner as described above with respect to the aluminum titanate (AT) compositions. In Run A (control), no gas was injected into the extruder whereas in Run B, $N_2$ gas was injected into the extruder at 40 psi. The extruded honeycombs from both experimental runs were dried in a microwave oven and fired in a kiln using a standard cordierite cycle. The porosity results of the fired cordierite honeycombs are shown in Table 7.

TABLE 7

| Experimental Run | Porosity % | $D_{50}(\mu m)$ | $(D_{50}-D_{10})/D_{50}$ |
|---|---|---|---|
| A (control) | 64.50 | 24.20 | 0.410 |
| B ($N_2$) | 69.40 | 28.47 | 0.442 |

As can be seen, Run B with $N_2$ injection showed significantly higher porosity than that of Run A control without any gas injection.

Modulus of Rupture (MOR) of the fired cordierite honeycombs from the 2 experimental runs was measured by the four-point flexural method on an axial specimen and is shown in Table 8.

TABLE 8

| Experimental Run | MOR average (PSI) | Standard deviation (PSI) |
|---|---|---|
| A (control) | 324.0 | 33.3 |
| B ($N_2$) | 167.7 | 12.5 |

As one would expect, the $N_2$ condition (Run B) showed notably lower MOR strength due to its higher porosity.

FIG. 5 plots pore size distribution of fired cordierite from Runs A-B. As can be seen, Run B with $N_2$ showed significant higher porosity while maintaining a narrow distribution similar to the control condition (Run A).

Figure 6A:
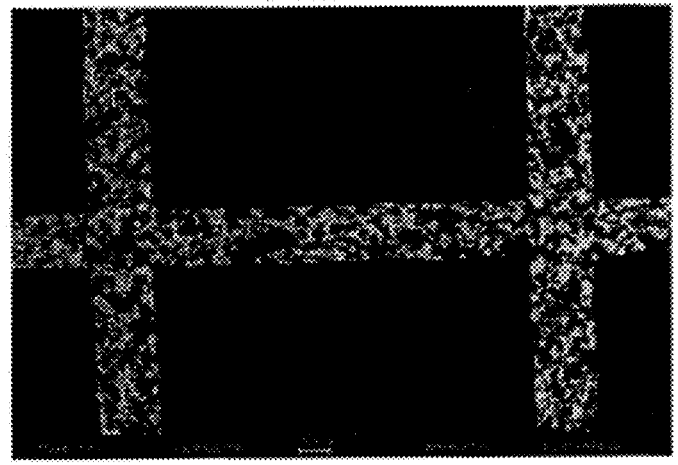
FIGS. 6A-6B show SEM micrographs of the polished cross-sectional surfaces for fired cordierite honeycomb bodies.
Figure 6B:
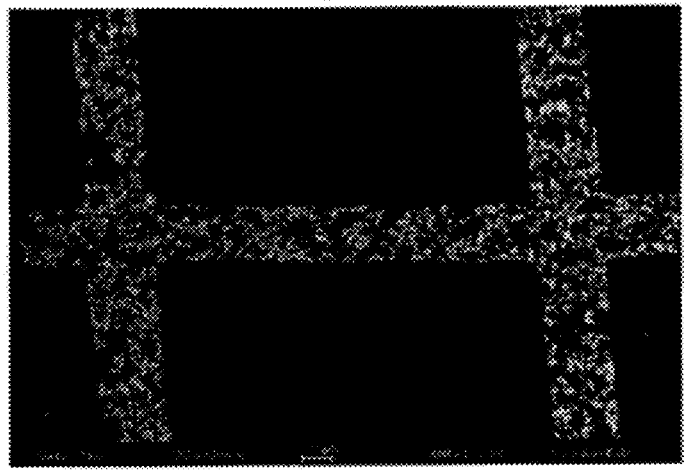

FIGS. 6A-6B show SEM micrographs of the polished surfaces for fired cordierite honeycombs. The $N_2$ condition (Run B) showed uniform pore distribution similar to the control condition (Run A) but with higher porosity Table 9 shows the coefficient of thermal expansion (CTE) between 25° C. and 800° C. for fired cordierite honeycombs for both heating and cooling cycles. It appeared that $N_2$ condition (Run B) showed CTE similar to that of control condition (Run A).

TABLE 9

| Experimental Run | CTE (heating 25-800° C.) $1 \times 10-7/°$ C. | CTE (cooling 25-800° C.) $1 \times 10-7/°$ C. |
|---|---|---|
| A (control) | 12.3 | 12.2 |
| B ($N_2$) | 11.1 | 11.4 |

Methods disclosed herein can provide for porous ceramic articles having a porosity of at least 55% and an axial modulus of rupture strength of at least 200 psi, such as a porosity of at least 57% and an axial modulus of rupture strength of at least 205 psi, and further such as a porosity of at least 59% and an axial modulus of rupture strength of at least 210 psi.

In addition, methods disclosed herein can provide for porous ceramic articles having a porosity of at least 65% and an axial modulus of rupture strength of at least 160 psi, such as a porosity of at least 67% and an axial modulus of rupture strength of at least 165 psi, and further such as a porosity of at least 69% and an axial modulus of rupture strength of at least 167 psi.

As disclosed in the examples, methods disclosed herein include those in which at least one pore former that exists in a solid phase at room temperature ("solid phase pore former") such as graphite or a starch containing pore former, are added to precursor batch material.

While not limited to any specific amount (if any) of solid phase pore former, exemplary embodiments include those in which the total amount of solid phase pore former is present in the precursor batch material in amounts ranging from about 5% to about 45% on a weight percent by super addition basis, including from about 10% to about 35% on a weight percent by super addition basis, and further from about 15% to about 25% on a weight percent by super addition basis.

In one set of exemplary embodiments, porous ceramic articles can be provided having a porosity of at least 50%, wherein the total amount of solid phase pore former present in the precursor batch material is less than about 25% on a weight percent by super addition basis, such as less than about 20% on a weight percent by super addition basis, and further such as less than about 15% on a weight percent by super addition basis, including from about 5% to about 20% on a weight percent by super addition basis.

In one set of exemplary embodiments, porous ceramic articles can be provided having a porosity of at least 55%, wherein the total amount of solid phase pore former present in the precursor batch material is less than about 25% on a weight percent by super addition basis, such as less than about 20% on a weight percent by super addition basis, and further such as less than about 15% on a weight percent by super addition basis, including from about 5% to about 20% on a weight percent by super addition basis.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of manufacturing a porous honeycomb ceramic article comprising:
    providing a precursor batch for forming a porous ceramic article;
    injecting a gas into the precursor batch, wherein the gas is pressurized to a positive gauge pressure;
    forming the precursor batch into a honeycomb green body via extrusion while maintaining the pressure;
    removing the pressure from the honeycomb green body; and
    firing the green body to produce a porous honeycomb ceramic article;
    wherein the positive gauge pressure is from about 10 psig to about 1000 psig.

2. The method of claim 1, wherein the gas comprises at least one component selected from the group consisting of nitrogen, helium, neon, argon, krypton, or xenon.

3. The method of claim 1, wherein the gas comprises at least 90% nitrogen by volume.

4. The method of claim 1, wherein the method further comprises the step of depressurizing an environment containing the precursor batch prior to injecting the gas into the precursor batch.

5. The method of claim 4, wherein the step of depressurizing comprises reducing the pressure by at least 90%.

6. The method of claim 1, wherein the precursor batch comprises at least one pore former selected from the group consisting of graphite and a starch containing pore former.

7. The method of claim 1, wherein the porous ceramic article comprises at least one material selected from the group consisting of aluminum titanate (AT), alumina ($Al_2O_3$), cordierite, mullite, silicon carbide (SiC), silicon aluminum oxynitride (SiAlON), and zeolites.

8. The method of claim 1, wherein the positive gauge pressure is from about 10 psig to about 250 psig.

9. The method of claim 1, wherein the gas comprises air.

10. The method of claim 1, wherein the gas comprises a mixture of at least two components selected from the group consisting of nitrogen, helium, and argon wherein each of said at least two components comprise at least 10% by volume of the mixture.

11. A method of manufacturing a porous honeycomb ceramic article comprising:
    providing a precursor batch for forming a porous ceramic article;
    injecting a gas into the precursor batch, wherein the gas is pressurized to a positive gauge pressure;
    forming the precursor batch into a honeycomb green body via extrusion while maintaining the pressure;
    removing the pressure from the honeycomb green body; and
    firing the green body to produce a porous honeycomb ceramic article;
    wherein the CO2 content of the gas is less than about 250 ppm.

12. The method of claim 11, wherein the positive gauge pressure is from about 10 psig to about 1000 psig.

13. The method of claim 11, wherein the gas comprises at least one component selected from the group consisting of nitrogen, helium, neon, argon, krypton, or xenon.

14. The method of claim 11, wherein the gas comprises at least 90% nitrogen by volume.

15. The method of claim 11, wherein the method further comprises the step of depressurizing an environment containing the precursor batch prior to injecting the gas into the precursor batch.

16. The method of claim 15, wherein the step of depressurizing comprises reducing the pressure by at least 90%.

17. The method of claim 11, wherein the precursor batch comprises at least one pore former selected from the group consisting of graphite and a starch containing pore former.

18. The method of claim 11, wherein the porous ceramic article comprises at least one material selected from the group consisting of aluminum titanate (AT), alumina ($Al_2O_3$), cordierite, mullite, silicon carbide (SiC), silicon aluminum oxynitride (SiAlON), and zeolites.

19. The method of claim 11, wherein the CO2 content of the gas is less than about 100 ppm.

20. The method of claim 11, wherein the gas comprises at least 99% nitrogen by volume.

* * * * *